US012689866B2

(12) United States Patent
Kereliuk et al.

(10) Patent No.: US 12,689,866 B2
(45) Date of Patent: Jul. 21, 2026

(54) FILTERBANK PITCHSHIFTER

(71) Applicant: Eventide Inc., Little Ferry, NJ (US)

(72) Inventors: Corey Kereliuk, Kingston (CA); Woodrow Q. Herman, New York, NY (US); Russell Wedelich, Nyack, NY (US)

(73) Assignee: Eventide Inc., Little Ferry, NJ (US)

( * ) Notice: Subject to any disclaimer, the term of this patent is extended or adjusted under 35 U.S.C. 154(b) by 147 days.

(21) Appl. No.: 18/531,099

(22) Filed: Dec. 6, 2023

(65) Prior Publication Data

US 2025/0193632 A1 Jun. 12, 2025

(51) Int. Cl.
*H04S 7/00* (2006.01)
*G10L 21/038* (2013.01)

(52) U.S. Cl.
CPC ............ *H04S 7/307* (2013.01); *G10L 21/038* (2013.01); *H04S 2420/07* (2013.01)

(58) Field of Classification Search
CPC ... H04S 7/307; H04S 2420/07; G10L 21/038; G10H 2210/066; G10H 2210/195; G10H 2210/325; G10H 2210/415; G10H 2250/085; G10H 2250/091; G10H 2250/115; G10H 2250/121; G10H 2250/215; G10H 2250/235; G10H 1/125; H03G 5/00
USPC ............................................... 381/98, 61, 56
See application file for complete search history.

(56) References Cited

U.S. PATENT DOCUMENTS 10,430,154 B2 10/2019 Gillespie et al.
11,594,234 B2 * 2/2023 Ekstrand ............... G10L 19/022
2005/0065784 A1 3/2005 McAulay et al.
2005/0149321 A1 * 7/2005 Kabi ....................... G10L 25/90 704/207
2012/0008799 A1 * 1/2012 Disch .................. G10L 19/0204 381/98
2021/0183357 A1 6/2021 Abel

OTHER PUBLICATIONS

N. Juillerat, S. Schubiger-Banz and S. M. Arisona, "Low Latency Audio Pitch Shifting in the Time Domain," 2008 International Conference on Audio, Language and Image Processing, Shanghai, China, 2008, pp. 29-35.
A. Michael Noll, "Pitch Determination of Human Speech By the Harmonic Product Spectrum, the Harmonic Sum Spectrum and a Maximum Likelihood Estimate," Presented at the Symposium on Computer Processing in Communications, Brooklyn, NY, USA, 1969.
Hermanowicz Ewa et al: "Sound processing 1,14 using complex dynamic representation", 2005 13th European Signal Processing Conference, IEEE, Sep. 4, 2005 (Sep. 4, 2005), pp. 1-4, XP032759818, ISBN: 978-1-60423-821-1 [retrieved on Apr. 1, 2015] * abstract; figures 1-4c * * Sections 1 to 5 *.
Extended European Search Report issued in Appln. No. 24217997.6 dated May 9, 2025 (9 pages).

* cited by examiner

*Primary Examiner* — Xu Mei
(74) *Attorney, Agent, or Firm* — Lerner David LLP

(57) ABSTRACT

Technique and mechanism for processing polyphonic audio signals. Processing includes filtering the audio signals to generate a set of narrow band signals, estimating an instantaneous magnitude and frequency associated with the narrow band signals and driving a bank of sinusoidal oscillators based on the instantaneous magnitude and frequency to create an output audio signal.

21 Claims, 5 Drawing Sheets

114

100

114

118

122

600

FILTERBANK PITCHSHIFTER

BACKGROUND

Audio signal processing involves manipulation of audio signals. Audio engineers, musicians, and, more generally, others who listen, work with, or create music (collectively "users") have been generating and manipulating audio signals for decades. For instance, audio engineers generate stereo signals by mixing together monophonic audio signals using effects such as pan and gain to position them within the stereo field, Users also manipulate audio signals into their individualized components for effects processing using multiband structures, such as crossover networks, for multiband processing. Additionally, audio effects, such as compression, distortion, delay, reverberation, etc., are often used to create sonically pleasing, and in some cases unpleasant sounds.

In addition to audio effects, audio signal processing has many other practical applications including, for example, audio synthesis, noise control, as well as others. Present day audio signal processing is typically done in the digital domain using specialized software or hardware. The type of hardware and software used to manipulate the audio signal is generally dependent upon the user's intentions. For example, musicians tend to use hardware such as foot pedals, amplifiers, and rack-mounted effects processors to manipulate the sound signal output of the instrument they are playing. Audio engineers tend to use analog mixers, digital audio workstations (DAWs), audio plug-ins, rack-mounted effects processors, and other such hardware and software to manipulate audio signals with the goal of creating a cohesive group of sound signals which are combined together to create a final output sound as part of a project. Users are constantly looking for new ways to create and manipulate audio signals.

SUMMARY

The disclosed technology may take the form of a process or method, an apparatus, or a system for processing polyphonic audio signals. Polyphonic audio signals generally include audio signals having multiple sound sources such as, for example, multiple concurrent sounds from different instruments or two or more notes that sound simultaneously (e.g., chord(s) on a guitar). The disclosed technology is primarily aimed at polyphonic pitch shifting, but can also be used in other applications, such as filtering polyphonic audio signals into coherent streams for further processing (e.g., separating and manipulating the notes in a chord independently). The disclosed technology mitigates against effects that impact producing a desired output sound, including frequency dispersion. Further, the processing techniques and mechanisms allow for use of the disclosed technology in live musical performances, e.g., in real-time and/or low latency conditions.

For example, the disclosed technology may take the form of an audio signal processing method. The method comprises filtering an input audio signal to generate a real signal and an imaginary signal; generating a set of narrowband signals using the real signal and the imaginary signal; generating one or more instantaneous frequency estimates and one or more instantaneous magnitude estimates using the real signal and the imaginary signal; modifying the one or more instantaneous frequency estimates or the one or more instantaneous magnitude estimates as part of an audio effect to produce a modified set of instantaneous frequency estimates or a modified set of instantaneous magnitude estimates; and synthesizing the modified set of instantaneous frequency estimates or the modified set of instantaneous magnitude estimates to produce an output audio signal.

In accordance with this aspect of the disclosed technology, the method may comprise using the audio output signal to drive an amplifier or a speaker.

In accordance with this aspect of the disclosed technology, synthesizing comprises driving a bank of oscillators using the modified set of instantaneous frequency estimates or the modified set of instantaneous magnitude. Further, filtering the input audio signal comprises using a Hilbert transform filter to filter the input audio signal to generate the real signal and the imaginary signal. In this regard, the Hilbert transform filter may comprise an infinite impulse response (IIR) Hilbert transform filter.

Further in accordance with this aspect of the disclosed technology, filtering the input audio signal comprises using a finite impulse response (FIR) filter to filter the input audio signal to generate the real signal and the imaginary signal. Further still, generating the set of narrowband signals comprises using a filterbank having a set of center frequencies non-uniformly distributed across the audible frequency spectrum. The set of center frequencies are distributed in accordance with the Mel scale or the equivalent rectangular bandwidth (ERB) scale or Equal Tempered Scale. In addition, the filterbank can comprise a set of IIR filters or one or more Butterworth filters or one or more Chebyshev filters.

Further in accordance with this aspect of the disclosed technology, generating the set of narrowband signals comprises using a filterbank to generate the set of narrowband signals such that each narrowband signal in the set is associated with a given bandwidth that increases monotonically as a function of frequency. Furthermore, each narrowband signal in the set is generated such that at least one narrowband signal at a higher frequency is delayed relative to another narrowband signal at a lower frequency.

Further in accordance with this aspect of the disclosed technology, modifying the one or more instantaneous frequency estimates or the one or more instantaneous magnitude estimates as part of an audio effect comprises scaling the instantaneous frequency estimates or instantaneous magnitude estimates to alter a pitch value associated with the input audio signal. For example, modifying may include multiplying the instantaneous frequency estimates or instantaneous magnitude estimates by an appropriate ratio to alter the pitch value associated with the input audio signal. For instance, the ratio may be proportional to a factor $\alpha=2^{c/1200}$.

In another example, the disclosed technology may take the form of an apparatus. The apparatus comprises a memory storing instructions and one or more processing devices coupled to the memory, the instructions causing the one or more processing devices to: filter an input audio signal to generate a real signal and an imaginary signal; generate a set of narrowband signals using the real signal and the imaginary signal; generate one or more instantaneous frequency estimates and one or more instantaneous magnitude estimates using the real signal and the imaginary signal; modify the one or more instantaneous frequency estimates or the one or more instantaneous magnitude estimates as part of an audio effect to produce a modified set of instantaneous frequency estimates or a modified set of instantaneous magnitude estimates; and synthesize the modified set of instantaneous frequency estimates or the modified set of instantaneous magnitude estimates to produce an output audio signal.

In accordance with this aspect of the disclosed technology, to cause the one or more processing devices to synthesize comprises driving a bank of oscillators using the modified set of instantaneous frequency estimates or the modified set of instantaneous magnitude. Further in accordance with this aspect of the disclosed technology, to cause the one or more processing devices to filter the input audio signal comprises using a Hilbert transform filter to filter the input audio signal to generate the real signal and the imaginary signal. Further still, to cause the one or more processing devices to filter the input audio signal comprises using a finite impulse response (FIR) filter to filter the input audio signal to generate the real signal and the imaginary signal. In addition, to cause the one or more processing devices to generate the set of narrowband signals comprises using a filterbank having a set of center frequencies non-uniformly distributed across the audible frequency spectrum.

Further in accordance with this aspect of the disclosed technology, the apparatus may comprise a harmonizer or an output that drives an amplifier or a speaker using the audio output signal.

DETAILED DESCRIPTION

Figure 1:
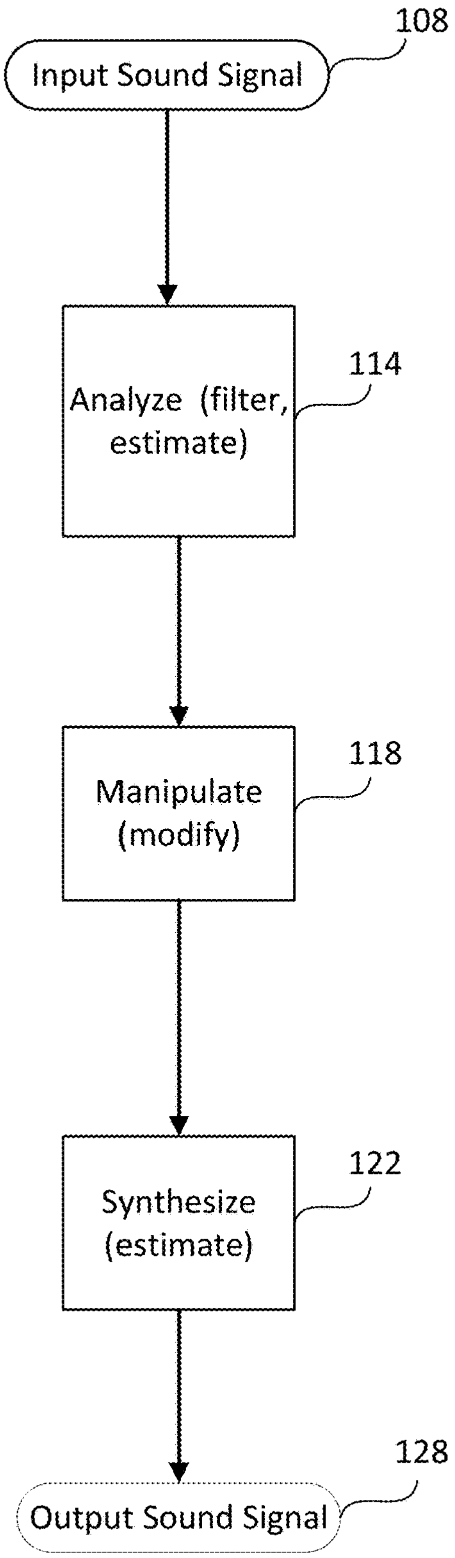
FIG. 1 illustrates an example process flow in accordance with an aspect of the disclosed technology.

FIG. 1 illustrates an example process flow 100 in accordance with an aspect of the disclosed technology. As shown, process flow 100 generally includes three processing stages or steps: analyze, manipulate, and synthesize. Specifically, process flow 100 starts with input sound signal 108 being received at analysis block 114. Analysis block 114 filters the input sound signal 108 and provides one or more estimates to manipulate block 118. Manipulate block 118 modifies or alters the estimates it receives and provides modified estimates to synthesize block 122. Synthesize block 122 drives one or more oscillators to generate a final output sound signal 128.

Figure 2:
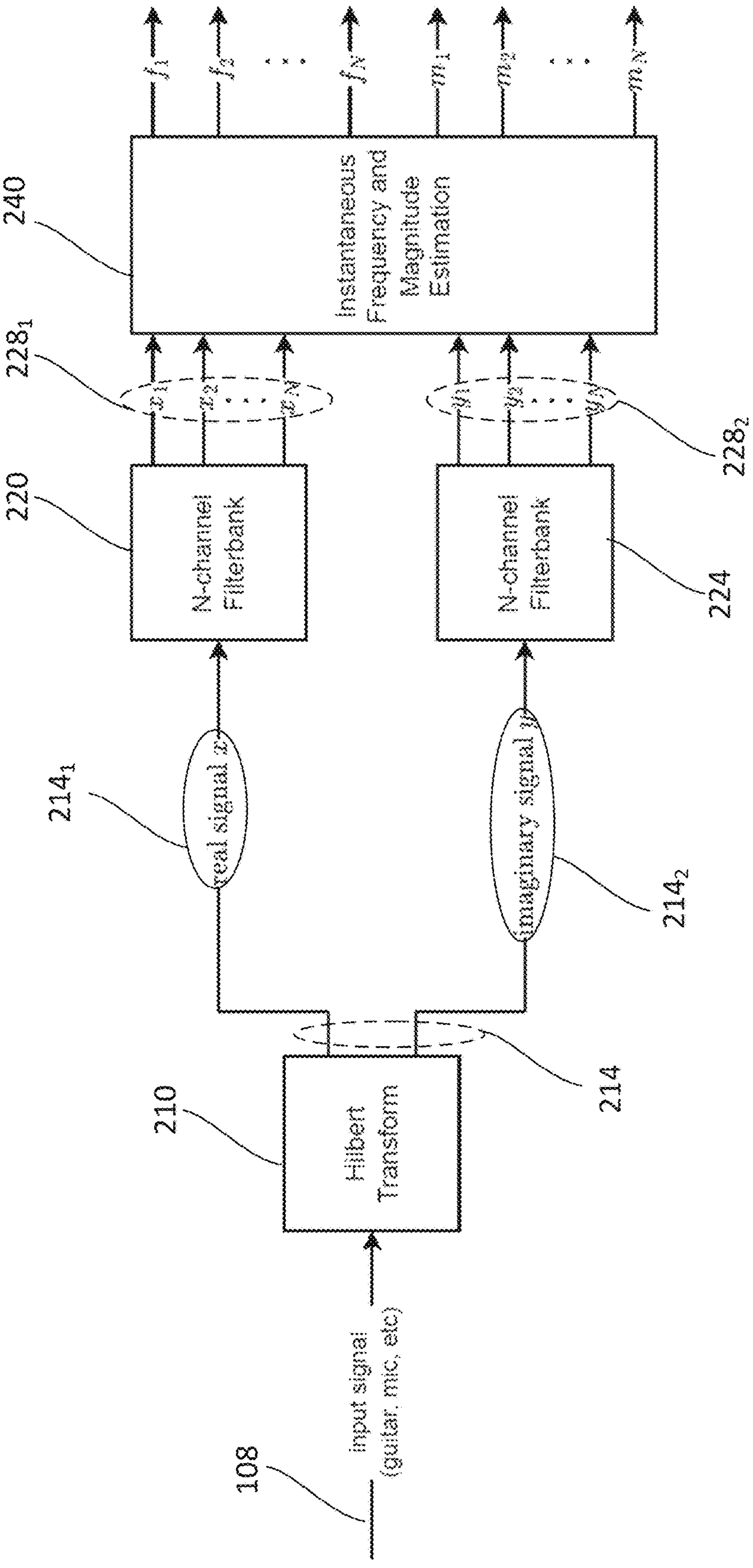
FIG. 2 illustrates an example processing flow in accordance with an aspect of the disclosed technology.

More specifically, the analysis block or stage 114 processes the input sound signal 108 as shown in FIG. 2. As shown in FIG. 2, the input sound signal 108 may be a signal generated by an instrument, such as a guitar for example, or sound picked up by a microphone. The input sound signal 108 is received at a filter 210 where it is filtered to generate an analytic signal 214. Filter 210 is shown as a Hilbert transform filter, but other filters capable of functioning as discussed below can also be used for filter 210. Analytic signal 214 includes a real component (real signal x $\mathbf{214}_1$) and an imaginary component (imaginary signal y $\mathbf{214}_2$).

In order to manipulate the spectral content of a real polyphonic signal, such as input signal 108, it is useful to generate the corresponding complex analytic signal 214 via a Hilbert transform filter 210. The Hilbert transform filter 210 removes the negative frequency components from a real signal, so that they do not interfere with the positive spectrum when modulating/manipulating the signal. Furthermore, the instantaneous frequency (IF) of a narrow band signal can be measured or estimated by measuring the derivative of the time-varying phase of the analytic signal 214.

For low-latency operation, filter 210 uses an infinite impulse response (IIR) Hilbert transform filter. Such a filter can be designed by transforming a Nyquist filter into an allpass phase splitting network. The allpass filters can be implemented as second order section (SOS) bi-quadratic filters. Other methods of generating the analytic signal are also possible, e.g., using finite impulse response (FIR) filters, or a complex filterbank.

As shown in FIG. 2, the real and imaginary components $\mathbf{214}_1$, $\mathbf{214}_2$, of the analytic signal 214, are further processed by filterbanks 220, 224 to generate a set of narrow band analytic signals $\mathbf{228}_1$ and $\mathbf{228}_2$ that cover the audible spectrum (between about 20 Hz and 20 kHz). The purpose of the filterbanks 220, 224 is to generate a set of narrow band signals, each of which isolates a small frequency range from the input signal 108 spectrum. For example, the frequency range can be non-uniform, which means that the center frequency and bandwidth of each filter increases as a function of frequency. This is not a strict requirement, but one that may work well in practice. It is also generally accepted that the auditory filters in the human nervous system operate in a similar way as in the case of a non-uniform frequency range. Examples of filterbank scales include the ERB (equivalent rectangular bandwidth) scale and the equal tempered scale (which is often used to tune many western musical instruments). These scales determine the center frequency and bandwidth of each filter in the filterbank. In an equal tempered scale there are typically 12 filters per octave (i.e., for each doubling in frequency). For instance, the following table lists the center frequencies and bandwidths of 48 filters on the ERB scale:

| Center Frequency (Hz) | Bandwidth (Hz) |
|---|---|
| 20 | 27 |
| 44 | 29 |
| 71 | 32 |
| 101 | 36 |
| 133 | 39 |
| 168 | 43 |
| 207 | 47 |
| 250 | 52 |
| 297 | 57 |
| 349 | 62 |
| 405 | 68 |
| 468 | 75 |
| 536 | 83 |
| 611 | 91 |
| 693 | 100 |
| 784 | 109 |
| 883 | 120 |
| 992 | 132 |
| 1112 | 145 |
| 1244 | 159 |
| 1388 | 175 |
| 1547 | 192 |
| 1721 | 211 |
| 1912 | 231 |
| 2122 | 254 |
| 2353 | 279 |
| 2606 | 306 |
| 2884 | 336 |
| 3190 | 369 |
| 3525 | 405 |
| 3893 | 445 |
| 4297 | 489 |
| 4741 | 537 |
| 5229 | 589 |

-continued

| Center Frequency (Hz) | Bandwidth (Hz) |
|---|---|
| 5764 | 647 |
| 6352 | 711 |
| 6998 | 780 |
| 7707 | 857 |
| 8485 | 941 |
| 9340 | 1033 |
| 10279 | 1135 |
| 11309 | 1246 |
| 12441 | 1368 |
| 13684 | 1503 |
| 15049 | 1650 |
| 16547 | 1812 |
| 18193 | 1990 |
| 20000 | 2185 |

The filterbank specification depends on a number of factors including the filter type (IIR vs. FIR) as well as the set of center frequencies and bandwidths. Because the human perception of pitch and latency are frequency dependent, a set of center frequencies non-uniformly distributed across the audible spectrum are chosen. In some examples, we have used the Mel scale and the ERB scale to define our filterbank layout, but the particular choice of frequency scale is application dependent.

In order to meet low-latency requirements (e.g., less than 15 ms), IIR filters can be used in the filterbanks 220, 224. The filter bandwidths are designed in order to control the attenuation at the crossover point between neighboring bands. A large amount of crossover attenuation will help reject out-of-band components, but may eventually color the sound due to spectral "notches" in between the bands.

For example, the bandwidth of the filterbank channels can be designed to increase monotonically as a function of frequency. In turn, the mean group delay of each band decreases as a function frequency. The result is a frequency dispersion that manifests itself as a falling chirp function. This chirp is sometimes audible for pronounced transients. We can reduce the amount of dispersion in the filterbank by decreasing the crossover attenuation between filters, which in turn reduces the maximal group delay of the filterbank. However, this may produce a side-effect of increasing the cross-talk between filterbank channels. We have implemented an alternative scheme in which the delay for higher frequency bands is tunable, so as to reduce the amount of dispersion in the filterbank. Using this method, we can control the trade-off between latency versus dispersion without affecting the crossover attenuation between filters. For instance, the delay compensation can be specified as a number between 0 and 1, where 0 equates to no compensation, and 1 equates to full compensation. At full compensation, every band is delayed so that the bands are time-aligned, maximally reducing dispersion. At 0 compensation, no delay is added. In practice, a value in between these two extremes is typically chosen based on user input. Due to the non-uniform layout of the filterbank, no two bands are delayed by the same amount. In the polyphony algorithm this parameter can be set to either 0.35 (pitched mode) or 0.5 (percussive mode).

Both Butterworth and Chebyshev filters can be used in implementing the filterbanks 220, 224. The Chebyshev filters have a steeper roll-off, at the expense of some additional passband ripple (the amount of which can be controlled).

Note that using the principle of linearity, the order filtering using the Hilbert transform filter 210 and filterbanks 220,

224 can be reversed with no effect on the process system. That is, a real signal can be filtered into a set of narrow bands, and a set of analytic signals can subsequently be generated by applying the Hilbert transform filter to each one of these bands.

Using the set of narrow band analytic signals $\mathbf{228}_1$ and $\mathbf{228}_2$, processing then moves to block 240, where instantaneous frequency and magnitude estimations are generated. Specifically, at block 240 the instantaneous magnitude (IM) and instantaneous frequency (IF) are estimated in each band and used to drive a bank of sinusoidal oscillators during the synthesis stage 122 (described in further detail below). The end result is that a sinusoid is properly or correctly shifted even if it is not aligned with a band's center frequency, and even if it falls in the crossover region between two bands.

More specifically, the narrow band signal in the kth filterbank channel can be represented as:

$$zk(t) = xk(t) + jyk(t) = ak(t)e^{j\phi k(t)} \tag{1}$$

where xk(t) and yk(t) represent the real and imaginary parts of the analytic signal, and ak(t) and ϕk(t) are the instantaneous magnitude and phase, respectively.

The IF is given by $$f_k(t) = \frac{d}{dt}\phi_k(t).$$

The derivative can be written alternatively as:

$$\left\{\frac{d}{dt}\log z_k(t)\right\} = x_k(t)y_k'(t) - y_k(t)x_k'(t) = \phi_k'(t) \tag{2}$$

Writing $x_k(t)$ using a Taylor series expansion we get:

$$x_k(t) = x_k(n) + (t-n)x_k'(n) + \frac{(t-n)^2}{2}x_k''(n) + E \tag{3}$$

where E represents higher-order terms.

Evaluating equation (3) at the point t=n T and re-arranging terms we get:

$$\frac{x_k(n) - x_k(n-T)}{T} = x_k'(n) - T/2x_k''(n) - E/T \tag{4}$$

The left-hand side of equation (4) is the backwards difference approximation to the continuous time derivative x'(t) at time n. Neglecting the term E/T, we can see that the error in this approximation is related to the second derivative:

$$-T/2x_k''(n).$$

For a sinusoidal signal, this error will oscillate at the same frequency as the sinusoid. The same is true of the error in the IF estimate in equation (2) due to linearity.

In practice, we estimate the IF directly using a backward difference on the analytic signal's phase:

$$\phi_k(t) = \arctan\left(\frac{yk(t)}{xk(t)}\right).$$

This requires phase unwrapping, since the measured phase is expected to be in the range [−π, π].

For suitably narrow band signals, the error in the backwards difference approximation to the first derivative (as outlined above) is a zero-mean signal. Thus, we can reduce the estimator's variance by averaging the IF over a short time-window with an FIR filter. We use an efficient recursive implementation of a box-car filter to do this. We have found that this is critical for some applications, e.g., freezing the signal (as discussed below).

The above approach overcomes some known drawbacks in preexisting systems. For example, in some preexisting systems pitch shifting is accomplished via single side-band modulation (SSB). This results in undesirable artifacts. Examples of such artifacts:

1. The pitch shifting ratio is correct only for frequency components perfectly aligned with each band's center frequency. Since the filterbank center frequencies do not vary as a function of time, this can introduce significant mis-tuning in the pitch shifted output.
2. When a sinusoidal component falls in the crossover region between two bands it will be shifted twice, and by two different amounts. This can induce considerable roughness in the pitch shifted output.

The above approach of estimating the instantaneous magnitude and instantaneous frequency (IM and IF) mitigates against and/or alleviates the two foregoing issues.

Figure 3:
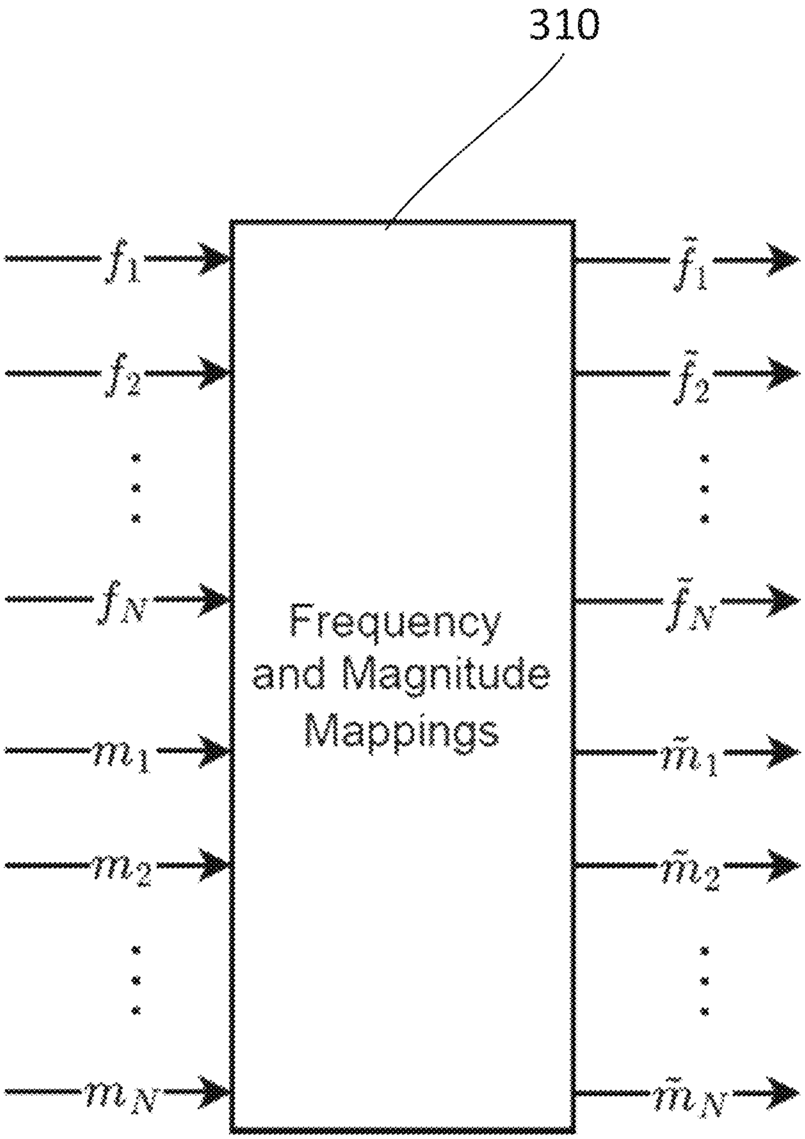
FIG. 3 illustrates an example processing flow in accordance with an aspect of the disclosed technology.

At the manipulate stage or block 118, the IM and IF signals are modified or altered as part of an audio effect, e.g., by multiplying the IF by an appropriate ratio to alter the pitch. In other cases, the bands can also be directly manipulated. For example, each band can be modulated by a different waveform to produce a band-dependent tremolo or frequency shift. As shown in FIG. 3, the output of manipulation stage or block 118 can represented as a frequency and magnitude mappings process 310 that generates modified versions of IF ($\tilde{f}$) and IM ($\tilde{m}$).

For example, process 310 may include scaling the IF. More specifically, in order to alter the pitch of a sound by c cents, we scale the IF in each band by a factor $\alpha=2^{c/1200}$. The IF may also be scaled in each band by different amounts. For instance, by using a multi-pitch analysis a set of time-varying fundamental frequencies can be determined. Each band can then be grouped with one of these fundamental frequencies. We can then pitch shift each band differently, depending on which group it belongs to. This allows for effects like major-to-minor transposition, and so on. It is also possible to "freeze" a signal by holding its IF constant over time.

Figure 4:
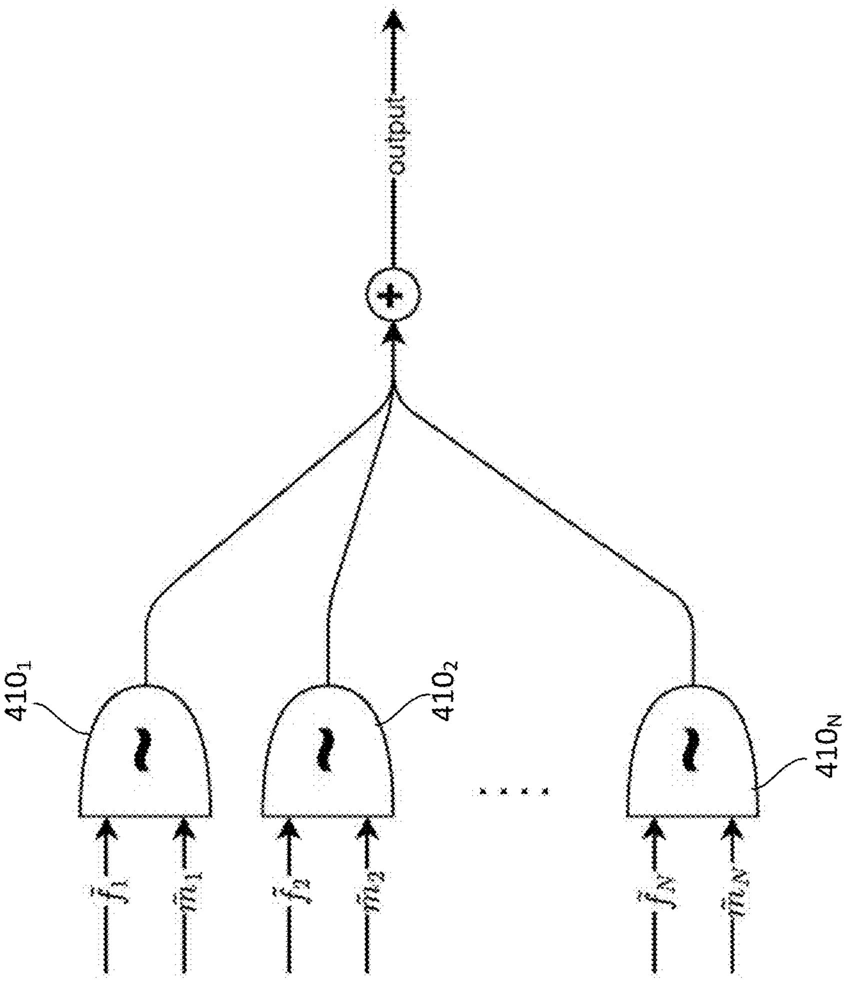
FIG. 4 illustrates an example processing flow in accordance with an aspect of the disclosed technology.

Returning to FIG. 1, the modified version of IF ($\tilde{f}$) and IM ($\tilde{m}$) are provided to or received by synthesis block 122. FIG. 4 shows an example of an implementation of the synthesis block or process 122 using a bank of sinusoidal oscillators 410, whose outputs are summed to provide the final output sound signal 128.

More specifically, as illustrated in FIG. 3, the signal from the (possibly manipulated) set of IM and IF measurements is synthesized by driving a bank of sinusoidal oscillators 410. The output at time t is defined as:

$$h(t) = \sum_k a_k(t)\cos\phi_k(t) \tag{5}$$

-continued where $$\phi_k(t) = \phi_0 + 2\pi\sum_{l=0}^{t} f_k(t) \tag{6}$$

and $f_k(t)$ is a possibly modified and smoothed instantaneous frequency estimate that has been suitably delayed, e.g., on the order of milliseconds or seconds, to counteract the dispersion in the filterbank. In some modes (e.g., percussive), compensation can be set to preserve the fidelity of transients, while in other modes (e.g., pitched), more bands (and less group delay compensation) can be used to improve performance on tonal sounds.

As can be seen from equation (6), $\phi_k(t)$, referred to as the running phase of the kth band, is a monotonically increasing sequence. Using standard 32-bit floating point values can lead to numerical errors which accumulate and grow as $\phi_k(t)$ increases. Within standard running times these errors can grow large enough to cause an audible de-tuning of the synthesized sinusoidal oscillators.

One possible solution to this problem is to use 64-bit double precision values to compute equation 6 and for storing the values of $\phi_k(t)$. However, on older processors without access to a double precision VFPU (Vector Floating Point Unit), this can result in significantly slower performance. Another option is to convert $f_k(t)$ from a floating point representation to a fixed point integer representation, and then store the values of $\phi_k(t)$ using the same fixed point type. This fixed point option has the following advantages:

1. The computational cost of converting to and from the fixed point values is less than the cost of using double precision floating point values on processors without a double precision VFPU.
2. Unlike the single precision floating arithmetic, the numerical error in the accumulated values of $\phi_k(t)$ remains constant, and is a function of the number of bits used for the fixed point integer type. This provides a useful tuning parameter to tailor the algorithm based on CPU and quality requirements.
3. Many fast table look up implementations of the cosine function make use of fixed point values to speed up indexing in to the table. The same integer type used in the look up table function can be used to store $\phi_k(t)$, in which case the conversion to the fixed point type doesn't really add any extra computation at all.

The description thus far has focused mainly on the application of polyphonic pitch shifting. However, if viewed more broadly as a low latency alternative to spectral processing done using the STFT (Short Time Fourier Transform), then the analysis stage opens the doors to numerous possibilities. Some of these are discussed below.

Guitar to Synth Transformation

Increasingly popular are a family of effects which aim to transform the sound of a guitar into another instrument entirely. Of particular interest is making the guitar sound like an analog synthesizer. Many of these synthesizers use complex waveforms (such as triangle, sawtooth, or square waves) to generate a rich spectrum of harmonics which can then be filtered to create a plethora of unique sounds in a process known as subtractive synthesis. By changing equation (5), the filterbank process discussed above can effect such a transformation. By replacing the cosine ("cos") with any other periodic function in (5), each band can output any number of more complex waveforms. For example, to generate a bipolar, full scale square wave in each band:

$$h(t) = \sum_k a_k(t)\, sq(\phi_k(t)) \quad (7)$$

where $$sq(\phi) = \begin{cases} -1.0 & \phi \le \pi \\ 1.0 & \phi \ge \pi \end{cases} \quad (8)$$

Generating a square wave or a more harmonically rich waveform as the output of each synthesized band can result in a signal with more harmonics than desired. This is because instruments like a guitar typically have many overtones in addition to the fundamental frequency of the note played. If these overtones have a loud enough amplitude, they will be synthesized as square waves themselves. A more appropriate output signal would consist of a single square wave oscillating at the fundamental frequency of the input signal in the monophonic case or a number of square waves oscillating at the fundamental frequencies of all detected notes in the polyphonic case. In accordance with the disclosed technology, we can also make use of the filterbank approach to help to decide which bands need to be synthesized. The following paragraphs, under the sub-heading "Polyphonic Pitch Detection," describe how the filterbank can be used to solve the problem of Multiple Pitch Estimation. Using this, it is possible to know which bands of the filterbank correspond to the fundamental frequencies of the input signal. If only those bands which have been deemed fundamental frequencies are synthesized, a more accurate representation of the sound of a synthesizer can be achieved.

Polyphonic Pitch Detection

A common problem in signal processing is that of Multiple Pitch Estimation. That is, for a given source signal detect the fundamental frequencies of all notes present. This problem becomes very challenging if we consider that the notes of almost all musical instruments are not simple sine waves, but rather have a series of harmonic frequencies above the fundamental that collectively make up the timbre of the instrument. Furthermore, many notes in common chord structures have fundamental frequencies which are themselves harmonics of other notes in the chord.

One method of performing a multiple pitch estimation is known as the Harmonic Sum methodology. The Harmonic Sum spectrum $\sigma(\omega)$ is defined as follows:

$$\sigma(\omega) = \sum_{k=1}^{K} |F(k\omega)|^2 \quad (9)$$

The most likely fundamental frequencies can then be deduced from the harmonic sum spectrum. This has the advantage of taking into account not only the energy of the fundamental frequency, but also of all K harmonics resulting in sharper peaks about the true fundamental frequency.

It can be seen from equation (9) that the Harmonic Sum requires calculating the Fourier Transform ($F(k\omega)$) at each fundamental frequency and up to K harmonics of that fundamental. Accomplishing this with traditional frame-based techniques using the FFT can be inefficient, since the FFT generates uniformly spaced frequency bins, with no guarantee that all possible $F(\omega)$ of interest will be calculated. This could require an additional transformation, and possibly interpolation to find $F(\omega)$ at some $\omega$ not centered at a spectral bin.

An advantage of the filterbank approach is that the center frequencies of each filter can be spaced non-uniformly. We can, for example, arrange each center frequency such that it follows the twelve-tone equal temperament scale. This guarantees that we estimate the magnitude at all frequencies of interest and their associated harmonics (assuming the source material uses the same scale). In this case, the center frequencies of each filter in hertz can be determined using the following:

$$fck = 440 * 2^{(n-49)/12} \quad (10)$$

where 440 represents the frequency of the reference pitch A4 and n−49 represents the integer number of steps away from the reference pitch, with each step representing one semitone.

Using a filterbank whose center frequencies are determined with equation (10) we can re-write the harmonic sum described in equation (9) in terms of the IM estimates in each band as:

$$\sigma_k(t) = \sum_h a_{k+h}(t) \quad (11)$$

where $$h = \{0, 12, 19, 24, \ldots\} \quad (12)$$

The value h refers to the integer index above the current band where the next harmonic of the current band is located. Since we have spaced the filter bands according to the twelve-tone equal tempered scale, then these values are equal to the number of half steps that each harmonic is located above the fundamental.

Low Latency Tonal Transient Split

Using the filterbank techniques described herein, the latency associated with available separating tonal and transient components of a source audio signal can be reduced-albeit with some possible loss of some resolution and accuracy. A suitable alternative method is presented here for the process which is not easily translated to the filterbank analysis. The method or process generally involves three steps: Peak Picking; Peak Verification; and Transient Stable Separation.

Peak Picking

The first step in the Transient Tonal Source Separation method (TTSS) is to pick peaks in the current analysis frame. This step is essentially the same in both the frame-based and filterbank-based approaches. If the magnitude in a given frequency bin or the IM estimate in a given filterbank band is greater than both of its neighbors and is above some heuristically determined threshold, then that bin, or band, is marked as a peak and labeled as tonal. It is this step that could potentially suffer from a loss of precision as there are an order of magnitude more frequency bins in a spectral frame than there are filterbank bands. This could be mitigated through clever design of the filterbank to focus on known important frequencies of the source material as described above in relation to Polyphonic Pitch Detection.

Peak Verification

This second step lacks a true analog in the filterbank approach. A spectral peak is not necessarily a single frequency bin, but can be made up of several adjacent frequency bins in an STFT frame. Since these bins are all considered part of the same spectral peak it is important to have each of those bins labeled the same (transient or tonal).

This can be accomplished by using the QIFFT to determine the temporal coherence of matched peaks in STFT frames. This process does not easily translate to the filterbank approach, but it is still necessary to attempt to determine if the neighboring bands to a previously labeled peak band are all part of the same spectral peak. Since the filters in the filterbank overlap, there is a high likelihood that a strong signal in one band may leak into adjacent bands. This will result in similar IF estimates in those adjacent bands if no other signal is present. To determine if adjacent bands are in fact part of the same spectral peak, we can do the following:

$$\frac{1}{tol} \geq \frac{f_{p+n}(t)}{f_p(t)} \leq tol \tag{13}$$

where $$tol = 2^{\frac{\frac{c}{100}}{12}} \tag{14}$$

In the above equations, p refers to some band that was previously marked as a peak in the peak picking step; p+n represents some range of bands above and below that peak band; and c is a value in cents representing how similar an IF estimate needs to be in order for that band to be labeled as part of the same spectral peak.

Transient Stable Separation

The final step in the TTSS algorithm is check the stability of each frequency bin across successive STFT frames. A bin that is more tonal will have a more continuous magnitude and instantaneous frequency. This is accomplished by calculating a single, complex difference which takes into account both the magnitude and instantaneous frequency. As in the peak picking step, this again translates very easily from a frame-based approach to the filterbank approach, the main difference being that the IF measurements occur every sampling period in the filterbank method. Adapting the complex difference measurement associated with the frame-based approach to use the IM and IF estimates of the filterbank results in:

$$\mathrm{cd}_k(t) = 1 + \frac{a_k(t)^2}{a_k(t-T)} - 2 * \frac{a_k(t)}{a_k(t-T)} * \cos(f_k(t) - f_k(t-T)) \tag{15}$$

This complex difference measurement ($\mathrm{cd}_k(t)$) can then be compared to a threshold, or processed with a soft masking function to determine the continuity of each filterbank band output.

Figure 5:
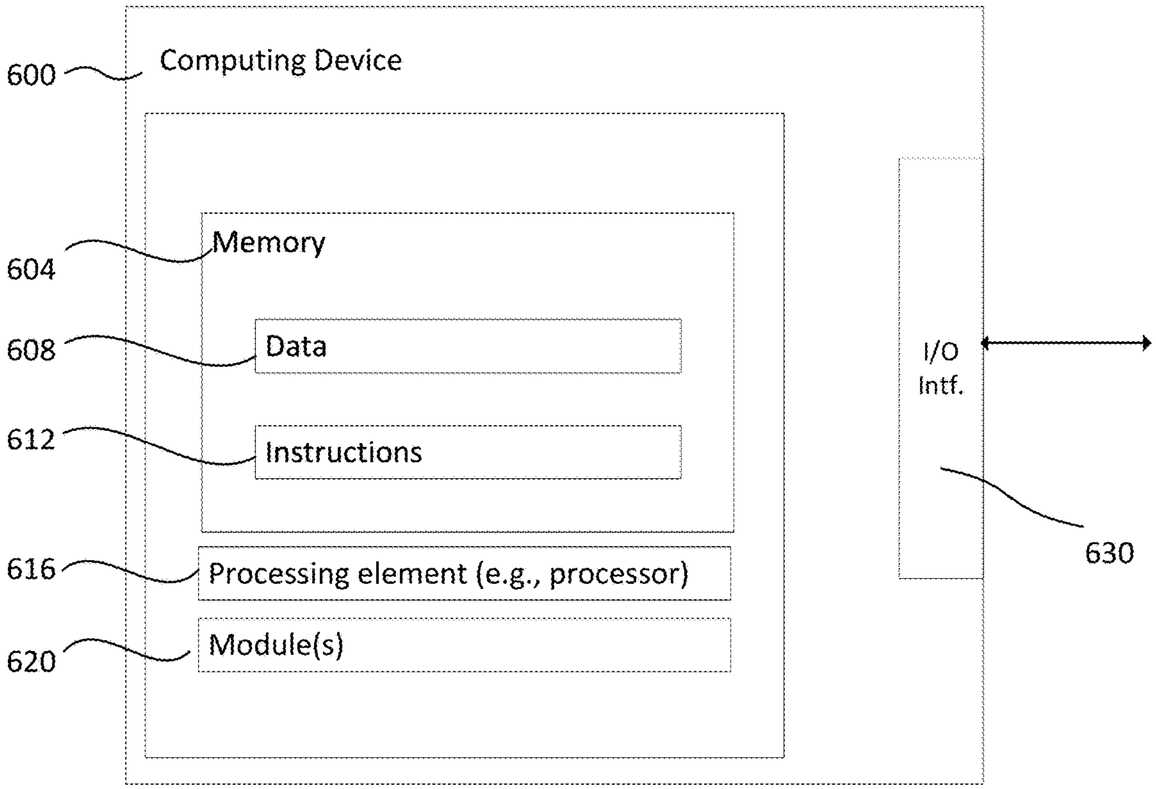
FIG. 5 illustrates an example apparatus in accordance with an aspect of the disclosed technology.

Turning now to FIG. 5, there is shown an apparatus 600 that can be configured to carry out the processes or methods discussed above. For example, the apparatus 600 can be configured using software or firmware to manipulate an audio signal in accordance with the processes and other components shown in FIGS. 1 through 4.

More specifically, apparatus 600 is an example computing device. The computing device 600 can take on a variety of configurations, such as, for example, a controller or microcontroller, a processor, or an ASIC. In some instances, computing device 600 may comprise a server or host machine that carries out the operations discussed above. In other instances, such operations may be performed by one or more computing devices in a data center. The computing device 600 may include memory 604, which includes data 608 and instructions 612, and a processing element 616, as well as other components typically present in computing devices (e.g., input/output interfaces for a keyboard, display, etc.; communication ports for connecting to different types of networks).

The memory 604 can store information accessible by the processing element 616, including instructions 612 that can be executed by processing element 616. Memory 604 can also include data 608 that can be retrieved, manipulated, or stored by the processing element 616. Memory 604 can operate as the host location database discussed above, and may also store flow entries and any other data used by the processing element 616 to carry out the processes of the disclosed technology. The memory 604 may be a type of non-transitory computer-readable medium capable of storing information accessible by the processing element 616, such as a hard drive, solid state drive, tape drive, optical storage, memory card, ROM, RAM, DVD, CD-ROM, write-capable, and read-only memories. The processing element 616 can be a well-known processor or other lesser-known types of processors. Alternatively, the processing element 616 can be a dedicated controller such as an ASIC.

The instructions 612 can be a set of instructions executed directly, such as machine code, or indirectly, such as scripts, by the processor 616. In this regard, the terms "instructions," "steps," and "programs" can be used interchangeably herein. The instructions 612 can be stored in object code format for direct processing by the processor 616, or can be stored in other types of computer language, including scripts or collections of independent source code modules that are interpreted on demand or compiled in advance. For example, the instructions 612 may include instructions to carry out the methods and processes discussed above in relation to technique and mechanisms processing polyphonic audio signals as discussed above.

The data 608 can be retrieved, stored, or modified by the processor 616 in accordance with the instructions 612. For instance, although the system and method are not limited by a particular data structure, the data 608 can be stored in computer registers, in a relational database as a table having a plurality of different fields and records, or in XML documents. The data 608 can also be formatted in a computer-readable format such as, but not limited to, binary values, ASCII, or Unicode. Moreover, the data 608 can include information sufficient to identify relevant information, such as numbers, descriptive text, proprietary codes, pointers, references to data stored in other memories, including other network locations, or information that is used by a function to calculate relevant data.

FIG. 5 functionally illustrates the processing element 616 and memory 604 as being within the same block, but the processing element 616 and memory 604 may instead include multiple processors and memories that may or may not be stored within the same physical housing. For example, some of the instructions 612 and data 608 may be stored on a removable CD-ROM and others may be within a read-only computer chip. Some or all of the instructions and data can be stored in a location physically remote from, yet still accessible by, the processing element 616. Similarly, the processing element 616 can include a collection of processors, which may or may not operate in parallel.

The computing device 600 may also include one or more modules 620. Modules 620 may comprise software modules that include a set of instructions, data, and other components (e.g., libraries) used to operate computing device 600 so that it performs specific tasks. For example, the modules may comprise scripts, programs, or instructions to implement one or more of the functions associated with the modules or components discussed above. The modules 620 may comprise scripts, programs, or instructions to implement the process flows or methods discussed above.

Computing device 600 may also include one or more input/output interfaces 630. Interface 630 may be used to communicate with users to receive input of parameters to use in manipulating the polyphonic audio signal processing as discussed above. In addition, interface 630 may comprise input to receive sound signals and an output signal that can be fed to a speaker or other device that produces sound. In some examples, interface 630 may also be a speaker. In addition, computing device 600 may be implemented as part of a harmonizer, which is typically used in live performances. It may also be implemented as part of other music devices designed to provide audio effects in either live or non-live environments. It may also be implemented as a software application that runs on one or more computing devices, e.g., instructions that cause the one or more processing devices to operate in accordance with one or more aspects of the disclosed technology described above. It may also be implemented as plugin(s), e.g., pieces of code or instructions that can be plugged into a digital audio workstation. Other implementation examples include mixers, effects processors, and other software and hardware used to manipulate sound.

Aspects of the disclosed technology may be embodied in a method, process, apparatus, or system. Those aspects may include one or more of the following features (e.g., F1 through F21):

F1 An audio signal processing method, comprising:
- filtering an input audio signal to generate a real signal and an imaginary signal;
- generating a set of narrowband signals using the real signal and the imaginary signal;
- generating one or more instantaneous frequency estimates and one or more instantaneous magnitude estimates using the real signal and the imaginary signal;
- modifying the one or more instantaneous frequency estimates or the one or more instantaneous magnitude estimates as part of an audio effect to produce a modified set of instantaneous frequency estimates or a modified set of instantaneous magnitude estimates; and
- synthesizing the modified set of instantaneous frequency estimates or the modified set of instantaneous magnitude estimates to produce an output audio signal.

F2. The audio signal processing method of F1, comprising using the audio output signal to drive an amplifier or a speaker.

F3. The audio signal processing method of any one of F1 to F2, wherein synthesizing comprises driving a bank of oscillators using the modified set of instantaneous frequency estimates or the modified set of instantaneous magnitude estimates.

F4. The audio signal processing method of any one of F1 to F3, wherein filtering the input audio signal comprises using a Hilbert transform filter to filter the input audio signal to generate the real signal and the imaginary signal.

F5. The audio signal processing method of F4, wherein the Hilbert transform filter comprises an infinite impulse response (IIR) Hilbert transform filter.

F6. The audio signal processing method of any one of F1 to F4, wherein filtering the input audio signal comprises using a finite impulse response (FIR) filter to filter the input audio signal to generate the real signal and the imaginary signal.

F7. The audio signal processing method of any one of F1 to F4 and/or F6, wherein generating the set of narrowband signals comprises using a filterbank having a set of center frequencies non-uniformly distributed across the audible frequency spectrum.

F8. The audio signal processing method of F7, wherein the set of center frequencies are distributed in accordance with the Mel scale or the equivalent rectangular bandwidth (ERB) scale or Equal Tempered Scale.

F9. The audio signal processing method of any one of F7 to F8, wherein the filterbank comprises a set of IIR filters.

F10. The audio processing method of any one of F7 to F8, wherein the filterbank comprises one or more Butterworth filters or one or more Chebyshev filters.

F11. The audio processing method of any one of F1 to F4 and/or F7 to F10, wherein generating the set of narrowband signals comprises using a filterbank to generate the set of narrowband signals such that each narrowband signal in the set is associated with a given bandwidth that increases monotonically as a function of frequency.

F12. The audio processing method of F11, wherein each narrowband signal in the set is generated such that at least one narrowband signal at a higher frequency is delayed relative to another narrowband signal at a lower frequency.

F13. The audio processing method of any one of F1 to F4 and/or F7 to F12, wherein modifying the one or more instantaneous frequency estimates or the one or more instantaneous magnitude estimates as part of an audio effect comprises scaling the instantaneous frequency estimates or instantaneous magnitude estimates to alter a pitch value associated with the input audio signal. For example, modifying may include multiplying the instantaneous frequency estimates or instantaneous magnitude estimates by an appropriate ratio to alter the pitch value associated with the input audio signal. For instance, the ratio may be proportional to a factor $\alpha = 2^{c/1200}$.

F14. An audio processing apparatus, comprising:
- a memory storing instructions; and
- one or more processing devices coupled to the memory, the instructions causing the one or more processing devices to:
  - filter an input audio signal to generate a real signal and an imaginary signal;
  - generate a set of narrowband signals using the real signal and the imaginary signal;
  - generate one or more instantaneous frequency estimates and one or more instantaneous magnitude estimates using the real signal and the imaginary signal;
  - modify the one or more instantaneous frequency estimates or the one or more instantaneous magnitude estimates as part of an audio effect to produce a modified set of instantaneous frequency estimates or a modified set of instantaneous magnitude estimates; and
  - synthesize the modified set of instantaneous frequency estimates or the modified set of instantaneous magnitude estimates to produce an output audio signal.

F15. The apparatus of F14, wherein to cause the one or more processing devices to synthesize comprises driving a bank of oscillators using the modified set of instantaneous frequency estimates or the modified set of instantaneous magnitude estimates.

F16. The apparatus of any one of F14 to F15, wherein to cause the one or more processing devices to filter the input audio signal comprises using a Hilbert transform filter to filter the input audio signal to generate the real signal and the imaginary signal.

F17. The apparatus of any one of F14 to F15, wherein to cause the one or more processing devices to filter the input audio signal comprises using a finite impulse response (FIR) filter to filter the input audio signal to generate the real signal and the imaginary signal.

F18. The apparatus of any one of F15 to F17, wherein to cause the one or more processing devices to generate the set of narrowband signals comprises using a filterbank having a set of center frequencies non-uniformly distributed across the audible frequency spectrum.

F19. The apparatus of any one of F14 to F18, wherein the apparatus comprises a harmonizer.

F20. The apparatus of any one of F14 to F18, wherein the apparatus comprises an output that drives an amplifier or a speaker using the audio output signal.

F21. The apparatus of any one of F14 to F18, wherein the instructions comprise a software application or a plugin.

Although the technology herein has been described with reference to particular examples, it is to be understood that these examples are merely illustrative of the principles and applications of the disclosed technology. It is, therefore, to be understood that numerous modifications may be made to the illustrative examples and that other arrangements may be devised without departing from the spirit and scope of the present technology as defined by the appended claims.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description should be taken by way of illustration rather than by way of limitation of the subject matter defined by the claims. In addition, the provision of the examples described herein, as well as clauses phrased as "such as," "including," and the like, should not be interpreted as limiting the subject matter of the claims to the specific examples; rather, the examples are intended to illustrate only some but not all possible variations of the disclosed technology. Further, the same reference numbers in different drawings can identify the same or similar elements.

The invention claimed is:

1. An audio signal processing method, comprising:

filtering an input audio signal to generate a real signal and an imaginary signal;

generating a set of narrowband signals using the real signal and the imaginary signal;

generating one or more instantaneous frequency estimates and one or more instantaneous magnitude estimates using the set of narrowband signals generated from the real signal and the imaginary signal;

modifying the one or more instantaneous frequency estimates or the one or more instantaneous magnitude estimates as part of an audio effect to produce a modified set of instantaneous frequency estimates or a modified set of instantaneous magnitude estimates; and synthesizing the modified set of instantaneous frequency estimates or the modified set of instantaneous magnitude estimates to produce an output audio signal.

2. The audio signal processing method of claim 1, comprising using the audio output signal to drive an amplifier or a speaker.

3. The audio signal processing method of claim 1, wherein synthesizing comprises driving a bank of oscillators using the modified set of instantaneous frequency estimates or the modified set of instantaneous magnitude estimates.

4. The audio signal processing method of claim 1, wherein filtering the input audio signal comprises using a Hilbert transform filter to filter the input audio signal to generate the real signal and the imaginary signal.

5. The audio signal processing method of claim 4, wherein the Hilbert transform filter comprises an infinite impulse response (IIR) Hilbert transform filter.

6. The audio signal processing method of claim 1, wherein filtering the input audio signal comprises using a finite impulse response (FIR) filter to filter the input audio signal to generate the real signal and the imaginary signal.

7. The audio signal processing method of claim 1, wherein generating the set of narrowband signals comprises using a filterbank having a set of center frequencies non-uniformly distributed across the audible frequency spectrum.

8. The audio signal processing method of claim 7, wherein the set of center frequencies are distributed in accordance with the Mel scale or the equivalent rectangular bandwidth (ERB) scale or Equal Tempered Scale.

9. The audio signal processing method of claim 8, wherein the filterbank comprises a set of IIR filters.

10. The audio processing method of claim 8, wherein the filterbank comprises one or more Butterworth filters or one or more Chebyshev filters.

11. The audio processing method of claim 1, wherein generating the set of narrowband signals comprises using a filterbank to generate the set of narrowband signals such that each narrowband signal in the set is associated with a given bandwidth that increases monotonically as a function of frequency.

12. The audio processing method of claim 11, wherein each narrowband signal in the set is generated such that at least one narrowband signal at a higher frequency is delayed relative to another narrowband signal at a lower frequency.

13. The audio processing method of claim 1, wherein modifying the one or more instantaneous frequency estimates or the one or more instantaneous magnitude estimates as part of an audio effect comprises scaling the instantaneous frequency estimates or instantaneous magnitude estimates to alter a pitch value associated with the input audio signal.

14. An audio processing apparatus, comprising:

a memory storing instructions; and one or more processing devices coupled to the memory, the instructions causing the one or more processing devices to:

filter an input audio signal to generate a real signal and an imaginary signal;

generate a set of narrowband signals using the real signal and the imaginary signal;

generate one or more instantaneous frequency estimates and one or more instantaneous magnitude estimates using the set of narrowband signals generated from the real signal and the imaginary signal;

modify the one or more instantaneous frequency estimates or the one or more instantaneous magnitude estimates as part of an audio effect to produce a modified set of instantaneous frequency estimates or a modified set of instantaneous magnitude estimates; and synthesize the modified set of instantaneous frequency estimates or the modified set of instantaneous magnitude estimates to produce an output audio signal.

15. The apparatus of claim 14, wherein to cause the one or more processing devices to synthesize comprises driving a bank of oscillators using the modified set of instantaneous frequency estimates or the modified set of instantaneous magnitude estimates.

16. The apparatus of claim 14, wherein to cause the one or more processing devices to filter the input audio signal comprises using a Hilbert transform filter to filter the input audio signal to generate the real signal and the imaginary signal.

17. The apparatus of claim 14, wherein to cause the one or more processing devices to filter the input audio signal comprises using a finite impulse response (FIR) filter to filter the input audio signal to generate the real signal and the imaginary signal.

18. The apparatus of claim 14, wherein to cause the one or more processing devices to generate the set of narrow-band signals comprises using a filterbank having a set of center frequencies non-uniformly distributed across the audible frequency spectrum.

19. The apparatus of claim 14, wherein the apparatus comprises a harmonizer.

20. The apparatus of claim 14, wherein the apparatus comprises an output that drives an amplifier or a speaker using the audio output signal.

21. The apparatus of claim 14, wherein the instructions comprise one of a software application or a plugin.

* * * * *